Dec. 1, 1964  G. A. DOTTO  3,159,245
BRAKE APPARATUS
Filed Sept. 27, 1962  3 Sheets-Sheet 1
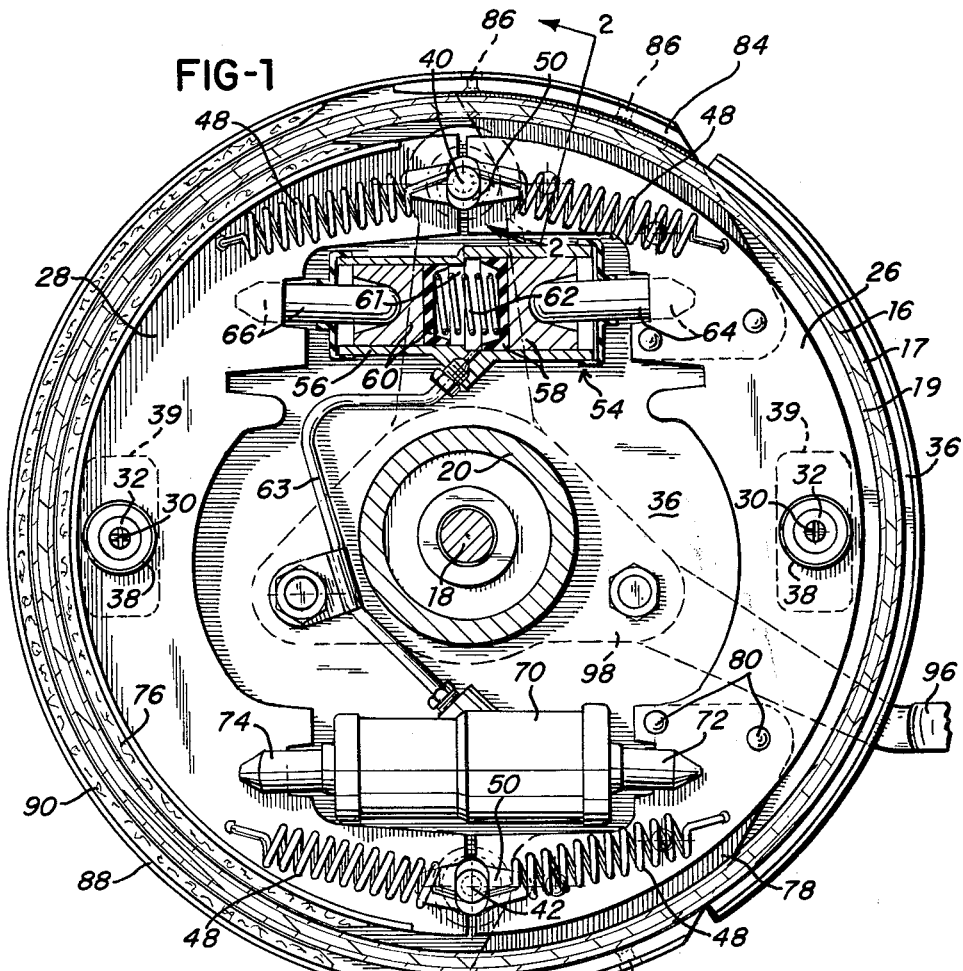
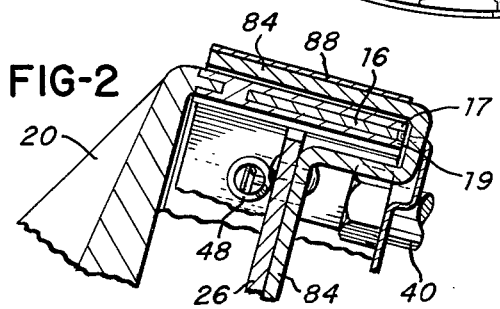
INVENTOR.
Gianni A. Dotto
BY William R Jacox
ATTORNEY

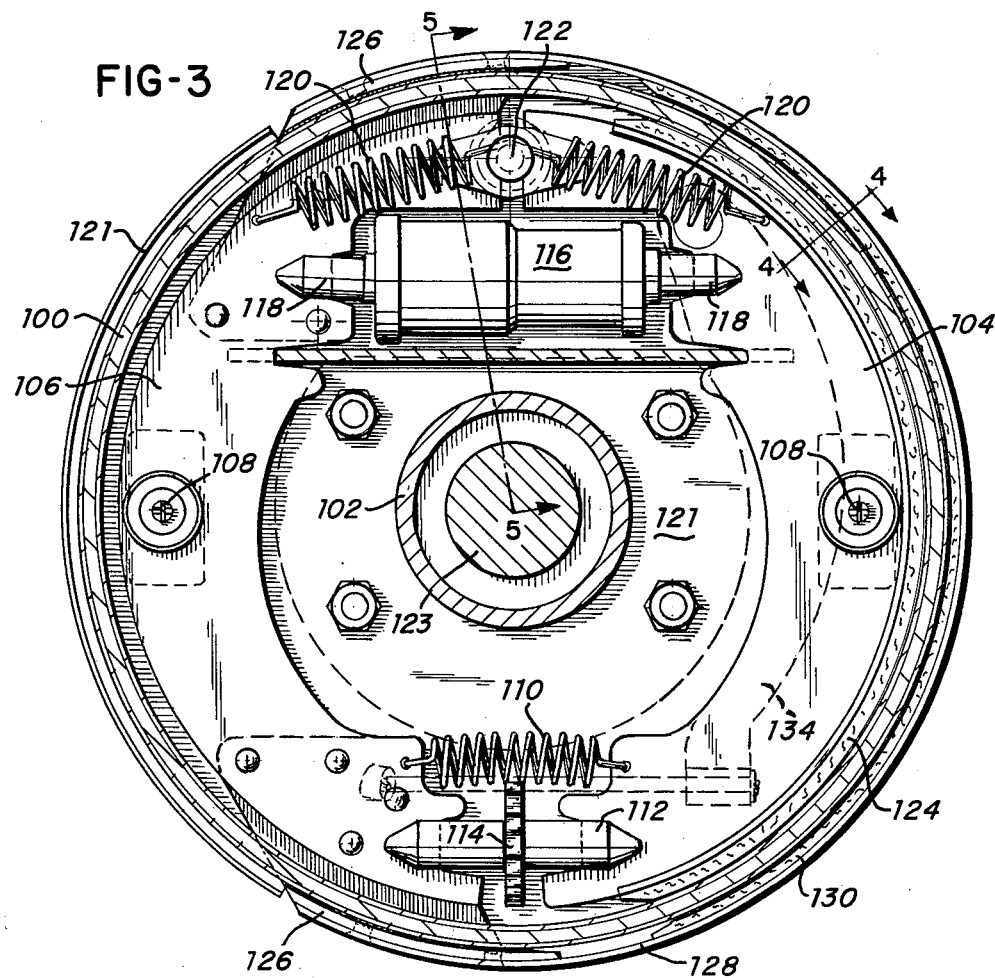
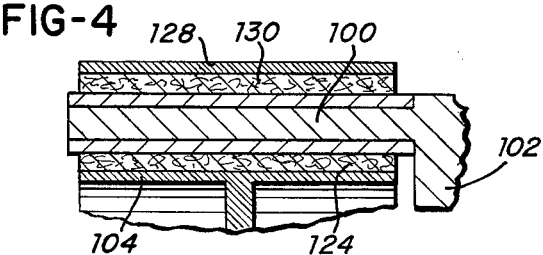

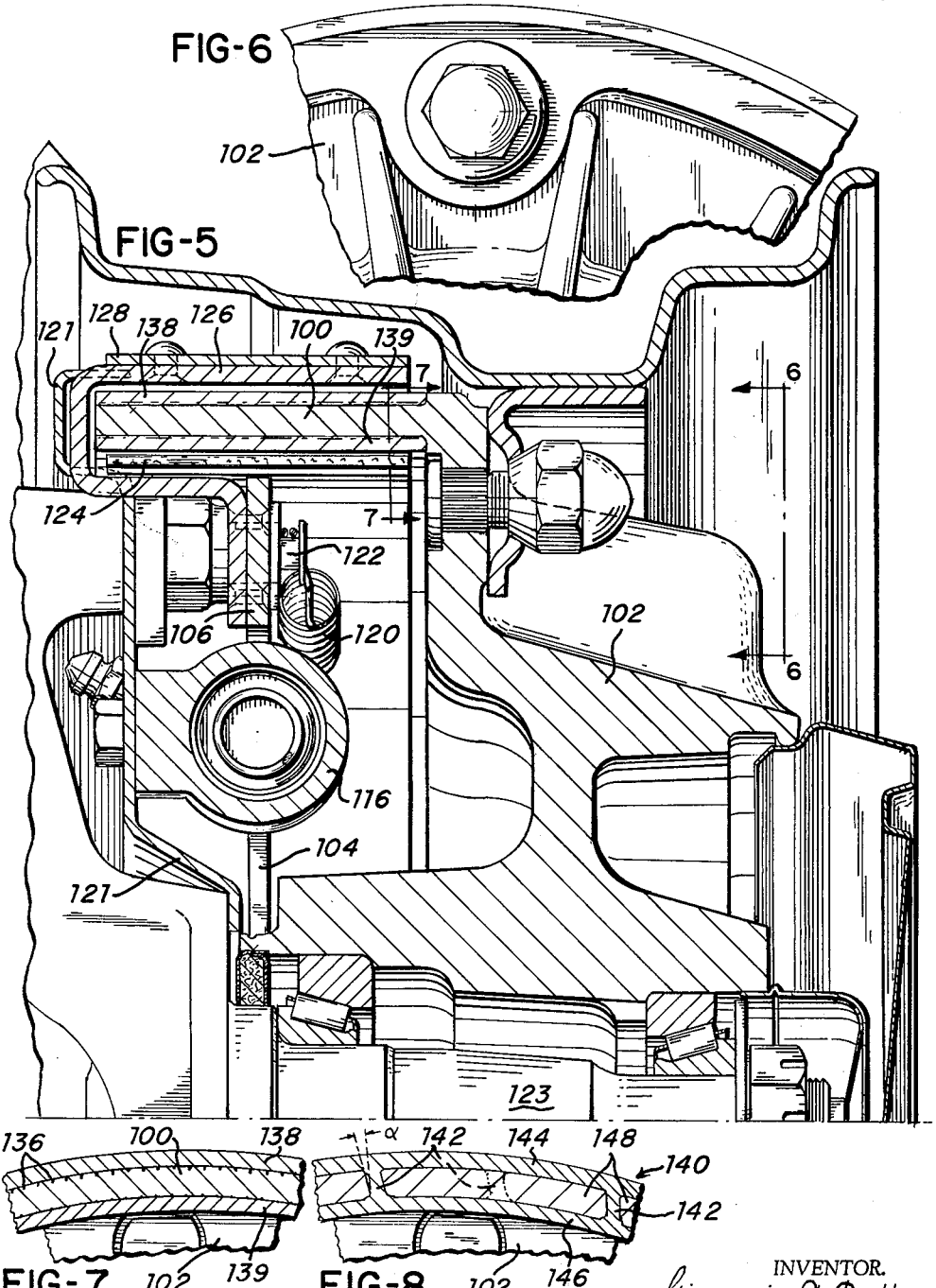

United States Patent Office 3,159,245
Patented Dec. 1, 1964

3,159,245
BRAKE APPARATUS
Gianni A. Dotto, 3005 Claar Ave., Dayton 29, Ohio
Filed Sept. 27, 1962, Ser. No. 226,588
6 Claims. (Cl. 188—76)

This invention relates to brake apparatus. The invention relates more particularly to brake apparatus in which a clamping action is provided upon opposite surfaces of a disc or drum or cylindrical plate for obtaining braking action.

An object of this invention is to provide brake apparatus which has the advantages of both the drum type of brake and the disc type of brake.

Another object of this invention is to provide a clamping type of brake apparatus in which self energizing action is obtained.

Another object of this invention is to provide disc type or clamping type of brake apparatus in which a greater mean radius of brake operation is obtained than would be obtained in drum brake apparatus of the same diameter.

Another object of this invention is to provide a clamping type of brake apparatus in which the slight necessary axial movement of the vehicle wheel presents no problem in regard to assembly or maintenance of other elements of the apparatus.

Another object of this invention is to obtain in a disc brake apparatus a desired or required ratio between brake lining area and vehicle weight in order to meet certain state law requirements or safety council recommendations.

Another object of this invention is to provide a clamping type of brake apparatus which is readily and easily adaptable to wheels having drum brake structure.

Another object of this invention is to provide such brake apparatus which readily accommodates the inclusion of parking brake mechanism.

Another object of this invention is to provide such clamping type of brake apparatus for association with wheel and bearing structure in which assembly or disassembly of any elements of the mechanism may be easily carried out.

Another object of this invention is to provide such brake apparatus which may be produced at relatively low costs and which is long-lived.

Other objects and advantages reside in the construction of parts, the combination thereof, the method of manufacture, and the mode of operation, as will become more apparent from the following description.

In the drawings:

FIGURE 1 is a sectional view of brake apparatus of this invention.

FIGURE 2 is an enlarged fragmentary sectional view taken substantially on line 2—2 of FIGURE 1.

FIGURE 3 is a sectional view of another embodiment of this invention.

FIGURE 4 is an enlarged fragmentary sectional view taken substantially on line 4—4 of FIGURE 3, but showing the elements thereof in braking position.

FIGURE 5 is an enlarged sectional view taken substantially on line 5—5 of FIGURE 3.

FIGURE 6 is a fragmentary elevational view taken substantially on line 6—6 of FIGURE 5.

FIGURE 7 is a sectional view taken substantially on line 7—7 of FIGURE 5.

FIGURE 8 is a sectional view, similar to FIGURE 7, but showing a modification in the structure thereof.

Referring to the drawings in detail, apparatus of this invention as shown in FIGURES 1 and 2 comprises an annular disc or dum or cylindrical plate 16. The disc or drum or cylindrical plate 16 has opposed surfaces or surface elements 17 and 19 which are parallel to a shaft 18 about which the drum 16 rotates. The surface element 17 is an outer element and has a convex engagement surface. The surface element 19 is an inner element and has a concave engagement surface. The disc or drum or plate 16 is carried by a wheel 20 which is rotatably mounted upon suitable bearing structure (not shown).

Encompassed by the disc or drum 16 are arcuate support members 26 and 28. A stud 30 having a collar 32 extends loosely through each of the support members 26 and 28 and freely attaches each of the support members 26 and 28 to a back plate 36 to which the studs or pins 30 are loosely attached. A spring 38 is disposed between each collar 32 and its respective support member 26 or 28 and urges its respective support member toward protuberances 39 of the back plate 36. Thus, the support members 26 and 28 are free for limited axial and lateral movement with respect to the disc or drum 16.

Between the upper ends of the support members 26 and 28, as shown in FIGURE 1, is an anchor pin 40 which is secured to the back plate 36. Intermediate the lower ends of the brake lining support members 26 and 28 is an anchor pin 42 which is secured to the back plate 36. Attached to the anchor pins 40 and 42 and to the support members 26 and 28 are a plurality of spring members 48, which urge the support members 26 and 28 toward the anchor pins 40 and 42. Encompassing each anchor pin 40 and 42 is a rotatable adjustment cam 50 for movement of the support members 26 and 28 with respect to the drum 16 to compensate for brake lining wear.

An actuator member 54 is disposed at the upper portion of the support members 26 and 28. The actuator member 54 includes a container 56 within which is slidably movably disposed opposed pistons 58 and 60. A spring 62 is in engagement with the pistons 58 and 60 and urges movement thereof one from the other. A chamber 61 is thus formed intermediate the pistons 58 and 60, into which fluid may flow from a conduit 63 which is joined to the container 56. The piston 58 has a rod 64 which extends from the container 56 and engages the support member 26. The piston 60 has a rod 66 which extends from the container 56 and engages the support member 28.

An actuator 70, similar to the actuator 54, is disposed adjacent the lower portion of the support members 26 and 28. The actuator 70 has a rod 72 in engagement with the support member 26 and a rod 74 in engagement with the support member 28. The actuator 70 is also connected to the fluid conduit 63 for obtaining fluid therefrom.

The support member 28 has a brake lining 76 attached thereto which is adapted to engage the inner surface element 19 of the disc or drum 16. The support member 26 has an arm or connector 78, which is somewhat U-shaped, and which is attached thereto adjacent the lower portion thereof. The arm or connector 78 is shown as being attached to the support member 26 by means of rivets 80. However, the arm 78 may be integrally attached to the support member 26 or secured thereto in any other suitable manner. The arm or connector 78 extends around or partially circumvents the rearward edge of the disc or drum 16 and has a portion adjacent the outer surface 17 of the disc or drum 16.

A U-shaped arm 84, shown in FIGURE 2, is attached in any suitable manner to the support member 26 adjacent the upper portion thereof. The U-shaped arm 84 partially circumvents the rearward edge of the disc or drum 16 and has a portion adjacent the outer surface 17 thereof. Attached to the arms 78 and 84 by rivets 86 or by any other suitable means is an arcuate strip 88. The strip 88 carries a brake lining 90 which is disposed adjacent the outer surface elements 17 of the disc or drum 16 and is adapted for engagement therewith.

Operation

When it is desired to provide braking action to the wheel 20, fluid is forced into the wheel cylinders or actuators 54 and 70 through the conduit 63. Thus, there is relative movement beween the support members 26 and 28 as the rods 64, 66, 72, and 74 are moved. Such relative movement between the support members 26 and 28 is against the resilient action of the springs 48.

A small amount of movement of the support member 28 toward the disc or drum 16 results in engagement of the brake lining 76 with the inner surface element 19 of the disc or drum 16. Also, when the support member 26 moves in a direction from the support member 28, the connectors 84 and 78 are moved thereby and move the brake lining 90 toward the disc or drum 16. Thus, a clamping action occurs at the lining members 76 and 90 move toward the disc 16 at opposite sides thereof.

Due to the fact that the support members 26 and 28 have limited movement in a rotative direction with the drum 16, there can be limited movement of the support members 26 and 28 as the linings 76 and 90 engage the disc or drum 16. If, for example, the disc 16 is rotating in a counterclockwise direction, as viewed in FIGURE 1, the support member 28 moves with the disc 16 in a counterclockwise direction as the lining 76 engages the disc 16. Such movement of the support member 28 ceases when it engages the anchor pin 42.

Also, as the lining 90 engages the outer surface element 17 of the disc 16, rotation of the disc 16 causes movement of the lining 90 in the direction of rotation of the disc 16, which results in movement of the support member 26 in the direction of rotation of the disc 16. Such movement of the support member 26 ceases when there is engagement thereof with the anchor pin 40.

Therefore, as forces are applied by the actuators 54 and 70, urging the support members 26 and 28 one from the other, there is pivotal movement of the support member 28 about the anchor pin 42 and there is pivotal movement of the support member 26 about the anchor pin 40.

Due to the fact that there is such pivotal movement of the support members 26 and 28, the pressure of the actuators 54 and 70 is in the direction of rotation of the drum 16. Thus, there is increased clamping action of the linings 76 and 90 upon the drum 16. Thus, there is self energized increase in braking action.

When the disc or drum 16 is rotating in the opposite direction, operation of the actuator members 54 and 70 causes the same type of self energization of increased clamping action.

A steering arm 96 and an associated plate 98 are shown connected to the back plate 36 and may be used for steering operation.

FIGURES 3, 4, 5, 6, and 7

FIGURES 3, 4, 5, 6, and 7 illustrate another embodiment of this invention. A disc or drum 100 is carried by a wheel 102. Support members 104 and 106 are encompassed by the disc or drum 100 and are supported by studs 108 for limited movement thereupon in the manner discussed above with respect to the support members 26 and 28 and the studs 30.

A spring 110 is attached to the support members 104 and 106 at the lower portion thereof and urges movement thereof one toward the other. An adjustment pin 112, having a nut 114 maintains desired spacing between the lower portion of the support members 104 and 106.

An actuator member 116, similar to the actuator 54 shown in FIGURE 1, is disposed adjacent the upper portion of the support members 104 and 106 and has actuator rods 118 in engagement therewith for relative movement therebetween. Springs 120 are attached to the support members 104 and 106 at the upper portion thereof and are also attached to an anchor pin 122. The springs 120 urge movement of the support members 104 and 106 one toward the other. The anchor pin 122 is carried by a back plate 121 which is carried by a spindle 123.

The support member 104 carries a lining 124. The support member 106 has arms 126 attached thereto at the opposite portions thereof. As shown in FIGURE 5, each arm 126 partially circumvents the disc or drum 100 and has a portion adjacent the outer surface thereof.

The arms 126 have attached thereto an arcuate strip 128 which carries a brake lining 130.

When the actuator 116 is energized by flow of fluid thereinto through any suitable conduit (not shown) there is relative movement between the upper portions of the support members 104 and 106. Such movement is against the resilient forces of the springs 120. Thus, the lining 124, carried by the support member 104, engages the disc or drum 100.

Movement of the support member 106 causes movement of the arcuate strip 128 which is attached thereto through the arms 126. Such movement of the arcuate strip 128 causes engagement of the brake lining 130 with the outer surface of the drum or disc 100. Thus, there is a clamping action upon the drum 100 as the actuator 116 causes the support members 104 and 106 to move the linings 124 and 130 into engagement with the drum 100.

If the disc or drum 100 is rotating in the clockwise direction, the support members 104 and 106 are moved in a clockwise direction. Thus, there is pivotal movement of the support member 104 about the adjustment pin 112, and thus there is pivotal movement of the support member 106 about the anchor pin 122 as engagement therebetween occurs. Thus, there is a self energized increase in the clamping action of the linings 124 and 130 as the support members 104 and 106 are moved slightly in the direction of rotation of the drum 100 as the linings 124 and 130 engage the drum 100.

Such self energized clamping action also occurs if the disc 100 is rotating in the counterclockwise direction when the actuator 116 is energized.

FIGURE 3 shows parking brake mechanism 134 which is connected to the support members 104 and 106 for operation thereof.

FIGURE 7 shows that the outer and inner surface elements of the disc or drum 100 may be keyed thereto by means of a plurality of small protuberances 136 so that surface elements 138 and 139 are secured against movement with respect to other portions of the disc or drum 100.

FIGURE 8 illustrates the manner in which a disc or drum may consist of a casting 140 having a plurality of connected cavities therein, in which a plurality of ribs 142 join outer and inner brake surface elements 144 and 146 respectively. A lighter weight material 148 than that of the casting 140 is used as a filling within the cavities. Thus, the filling material 148 serves as a support material for the brake surface elements 144 and 146.

In order to compensate for the difference in the coefficients of expansion between the material forming the surface elements 144 and 146 and the filling material 148, the ribs 142 are inclined at an angle different from a radial line of the drum formed by the materials of the elements 144, 146, and 148. Thus, the ribs 142 move somewhat toward a radial line and compensate for the increase in spacing between the inner brake surface 146 and the outer brake surface 144 as heating causes expansion of the diameter of the elements 144 and 146.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:
1. Brake apparatus comprising:
   support structure,
   a drum rotatably carried by the support structure, the drum having a pair of opposed surfaces,
   support means within the drum and freely carried by the support structure, the support means being movable toward and away from the drum, the support means also being movable in the direction of rotation of the drum, the support means being pivotally movable with respect to the drum,
   abutment means engageable by the support means for pivotal action of the support means thereabout,
   engagement means carried by the support means and disposed adjacent the opposed surfaces of the drum,
   actuator means within the drum for movement of the support means, such movement of the support means causing the engagement means to move into engagement with the drum at opposed surfaces thereof, engagement of the engagement means with the drum causing movement of the engagement means in the direction of rotation of the drum, thus causing the support means to move in the direction of rotation of the drum so that there is engagement of the support means with the abutment means causing pivotal action of the support means thereabout and causing pivotal action of the engagement means toward the opposed surfaces of the drum so that increased pressure is applied by the engagement means upon opposed surfaces of the drum by pivotal action of the engagement means with pivotal action of the support means as rotative movement of the drum urges the support means into engagement with the abutment means and as the actuator means urges movement of the support means.

2. Brake apparatus comprising:
   a rotatable hollow cylindrical drum, the drum having an outer engagement surface and an inner engagement surface,
   a plurality of free floating support members disposed within the drum, each of the support members being movable toward and away from the drum, each of the support members also being movable in the direction of rotation of the drum, each of the support members being pivotally movable with respect to the drum,
   abutment means engageable by the support members for limiting movement thereof in the direction of rotation of the drum,
   engagement means carried by one of the support members and engageable with the inner engagement surface of the drum upon movement of the support member,
   one of the support members having an extension portion adjacent the outer engagement surface of the drum,
   engagement means carried by said extension portion of the support member and disposed adjacent the outer engagement surface of the drum and engageable therewith upon movement of the support member,
   and operator means for causing relative movement between the support members for causing engagement of the engagement means with the drum,
   engagement of the engagement means with the drum causing the support members which carry the engagement means to move in the direction of rotation of the drum until the support members are prevented by the abutment means from further movement in the direction of rotation of the drum, the force of the operator means upon the support members as the support members engage the abutment means and as the engagement means engage the drum upon the inner and outer engagement surfaces thereof causing pivotal action of the support members and increased pressures of the engagement means upon opposite engagement surfaces of the drum.

3. Brake apparatus for a wheel comprising:
   a rotatable annular disc attached to the wheel for rotation therewith, the disc having an inner arcuate surface and an outer arcuate surface, each arcuate surface having all portions thereof substantially equidistant from the axis of rotation of the disc,
   support structure adjacent the disc,
   a first support member movably carried by the support structure,
   a second support member movably carried by the support structure,
   both of the support members being at least partially disposed within the confines of the disc,
   each of the support members being generally semicircular in shape with the ends thereof adjacent substantially diametrically opposed portions of the disc, each end of each of the support members being adjacent an end of the other support member,
   each of the support members being movable toward and away from the inner surface of the disc, each of the support members also being movable in the direction of rotation of the disc,
   a pair of anchor pins carried by the support structure and disposed intermediate the ends of the support members and engageable thereby,
   each of the support members being pivotally movable about either of the anchor pins when in engagement therewith,
   resilient means attached to the anchor pins and to the support members urging movement of the support members one toward the other,
   a pair of fluid operable actuator members carried by the support structure, each of the actuator members having a pair of oppositely movable piston members, there being an actuator member adjacent each end of each of the support members and operable by opposed movement of the pistons thereof to urge the support members one from the other,
   the first support member having an engagement surface adjacent the inner surface of the disc and engageable therewith upon sufficient movement of the first support member toward the disc,
   the second support member having an engagement surface adjacent the outer surface of the disc and engageable therewith upon sufficient movement of the second support member toward the disc,
   movement of the support members by the piston members of the actuator members thus causing engagement of the engagement surfaces thereof with opposite surfaces of the disc, such engagement of the support members with the disc during rotation thereof causing movement of the support members in the direction of movement of the disc and into engagement with the anchor pins, followed by pivotal action of the support members about the anchor pins, thus causing increased pressure of the engagement surfaces upon said opposite surfaces of the disc.

4. Brake apparatus for a wheel rotatably supported by a spindle structure comprising:
   a hollow cylindrical drum having an inner surface and an outer surface, the drum being attached to the wheel for rotation therewith,
   a pair of support members movably carried by the spindle structure, each of the support members being disposed within the drum, the support members being at adjacent opposite portions of the inner surface of the drum, one of the support members being a first support member, one of the support members being a second support member and having an arm partially circumventing the drum to a position adjacent the outer surface thereof,
   a pair of anchor pins carried by the spindle structure at substantially diametrically opposed positions within the drum, each of the support members having opposite ends thereof adjacent the two anchor pins, each of the support members being movable toward and away from the inner surface of the drum, each of the support members being movable in either direction of rotation of the drum, each of the support members being pivotally movable about either of the anchor pins, resilient means attached to the support members and to the anchor pins and urging the support members one toward the other, a pair of fluid operable actuators disposed intermediate the support members and operable to move the support members relatively one from the other, first engagement means, the first engagement means being carried by the first support member and being engageable with the inner surface of the drum, second engagement means, the second engagement means being carried by the arm of the second support member adjacent the outer surface of the drum and engageable therewith, movement of the support members one from the other by the actuators causing the first engagement means to move toward the inner surface of the drum and into engagement therewith, movement of the support members one from the other also causing the second engagement means to move toward the outer surface of the drum and into engagement therewith, such movement of the support members thus resulting in movement of the engagement means and the support members by the drum in the direction of rotation of the drum so that each of the support members engages one of the anchor pins and is urged by an actuator to pivot about the anchor pin so that self energized braking action and increased braking forces upon the drum by the engagement means occurs.

5. Brake apparatus comprising:

support structure, a hollow cylindrical drum rotatably carried by the support structure, the drum having an inner concave engagement surface and an outer convex engagement surface, a pair of support members movably carried by the support structure, each of the support members having at least a portion thereof within the drum, each of the support members being movable toward and away from the inner surface of the drum, each of the support members being movable in the direction of rotation of the drum, each of the support members being pivotally movable, abutment means engageable by the support members, each of the support members being pivotally movable about the abutment means when in engagement therewith, actuator means engageable with the support members for causing relative movement therebetween and for urging pivotal movement thereof, engagement means carried by one of the support members and engageable with the inner surface of the drum throughout a portion thereof, engagement means carried by the other support member and engageable with the outer surface of the drum throughout substantially the same portion thereof as engaged by the first said engagement means, the actuator means moving that engagement means into initial engagement with the drum, the drum causing movement of the engagement means in the direction of rotation of the drum, the support members thus being caused to move in the direction of rotation of the drum so that the support members engage the abutment means and tend to pivotally move about the abutment means as the actuator means urges movement of the support members, pivotal urging of the support members by the actuator means causing increased forces of the engagement means upon the drum.

6. Brake apparatus comprising:

a rotatable hollow cylindrical drum provided with an inner engagement surface and an outer engagement surface, a pair of movable support members, each of the support members having at least a portion thereof within the drum, each of the support members having the opposite ends thereof adjacent substantially diametrically opposite portions of the drum, each of the support members being movable toward and away from the inner surface of the drum at opposite portions thereof, each of the support members being pivotally movable, each of the support members being movable in the direction of rotation of the drum, an abutment member intermediate the support members at one end thereof, a fluid operable actuator adjacent the abutment member and having opposed pistons to move the support members in directions one from the other and toward the inner engagement surface of the drum, a pin adjustable in length intermediate the support members at the other end thereof and in engagement therewith, an engagement element carried by one of the support members and engageable with the inner surface of the drum with movement of its support member toward the inner surface of the drum, the other support member having a portion thereof adjacent the outer engagement surface of the drum, an engagement element carried by said portion of said other support member and engageable with the outer engagement surface of the drum with movement of its support member toward the inner surface of the drum, said engagement elements being engageable with the drum as the pistons of the actuator move the support members, the engagement elements moving with rotation of the drum until one of the support members engages the abutment member, the actuator then causing pivotal action of the support members about the pin and about the abutment member so that by pivotal leverage action each of the engagement elements is urged to a greater degree into contact with its respective surface of the drum.

References Cited by the Examiner
UNITED STATES PATENTS

| | | | |
|---|---|---|---|
| 615,528 | 12/89 | Clark | 188—76 |
| 1,097,451 | 5/14 | Linfoot | 188—76 |
| 1,214,778 | 2/17 | Haen | 188—76 |
| 1,711,321 | 4/29 | McNelles | 188—76 |
| 1,831,919 | 11/31 | Mallinger | 188—76 X |
| 2,018,912 | 10/35 | Carroll | 188—76 X |
| 2,127,739 | 8/38 | La Brie | 188—78.24 |
| 2,192,696 | 3/40 | Rosenberg | 188—76 |
| 2,268,685 | 1/42 | Walther et al. | 188—76 |

ARTHUR L. LA POINT, *Primary Examiner.*

RALPH D. BLAKESLEE, *Examiner.*